United States Patent [19]

Chobert et al.

[11] Patent Number: 6,124,379
[45] Date of Patent: Sep. 26, 2000

[54] METHOD FOR PREPARING A PIGMENT FOR POLYVINYLCHLORIDE COLORING

[76] Inventors: Helen M. Chobert; Robert A. Lindner, both of 115 Hemlock Dr., North Wales, Pa. 19454

[21] Appl. No.: 08/529,512

[22] Filed: Sep. 18, 1995

[51] Int. Cl.[7] ...................................................... C08K 5/16
[52] U.S. Cl. .......................... 523/333; 106/410; 106/412; 106/413; 106/499; 106/504; 523/351; 264/117; 524/88; 524/310; 524/313
[58] Field of Search ............................. 524/88, 310, 313; 106/410, 412, 413, 499, 504; 264/117; 523/333, 351

[56] References Cited

U.S. PATENT DOCUMENTS

| | | | |
|---|---|---|---|
| 3,578,621 | 5/1971 | Stapfer | 260/31.6 |
| 3,775,149 | 11/1973 | Langley et al. | 106/412 |
| 3,875,069 | 4/1975 | Worschech | 252/56 S |
| 3,951,883 | 4/1976 | Ruchlak et al. | 260/2.5 M |
| 3,981,838 | 9/1976 | Wilson | 260/31.6 |
| 4,072,657 | 2/1978 | Tanaka et al. | 260/47 |
| 4,102,839 | 7/1978 | Crochemore et al. | 260/23 X |
| 4,264,552 | 4/1981 | McMahon et al. | 264/117 |
| 4,336,176 | 6/1982 | Lindner | 524/310 |
| 4,338,226 | 7/1982 | Worschech et al. | 524/302 |
| 4,392,581 | 7/1983 | Itsubo et al. | 215/348 |
| 4,425,458 | 1/1984 | Lindner | 524/314 |
| 4,487,874 | 12/1984 | Lindner | 524/311 |
| 4,645,795 | 2/1987 | Hosoi et al. | 525/83 |
| 4,690,977 | 9/1987 | Hosoi et al. | 525/83 |
| 4,797,440 | 1/1989 | Schofield et al. | 524/239 |

FOREIGN PATENT DOCUMENTS

| | | |
|---|---|---|
| 52-010893 | 3/1977 | Japan . |
| 58-168661 | 10/1983 | Japan . |

*Primary Examiner*—Judy M. Reddick

[57] ABSTRACT

A system providing desirable properties for introducing a pigment to a polar polymer such as polyvinylchloride resin is disclosed. The system also is valuable in that pigments are conveniently dissolved or dispersed and blended in an a polyester component which is otherwise useful for polar polymer processing. Also disclosed is the mixing of the polyester component, phthalocyanine compounds, and the polyvinylchloride resins. Stronger color development is obtained by using the system of the present invention.

15 Claims, No Drawings

METHOD FOR PREPARING A PIGMENT FOR POLYVINYLCHLORIDE COLORING

BACKGROUND OF THE INVENTION

1. Field of the Invention

This invention describes coloring systems for polymers, and in particular polar polymers such as polyvinylchloride. The invention also describes articles made from polyvinylchloride and a method of extrusion utilizing the coloring systems with polyvinylchloride. The coloring systems are particularly valuable in that phthalocyanine compounds may be dissolved or dispersed and blended into polyvinylchloride resins such that the phthalocyanine compounds are evenly distributed throughout the finished polyvinylchloride article.

2. Description of the Art Practices

U.S. Pat. No. 4,425,458 issued Jan. 10, 1984 to Lindner describes the use of polyguerbet alcohol esters as lubricants for polycarbonate. U.S. Pat. No. 4,487,874 issued Dec. 11, 1984 to Lindner discloses polycarbonate lubricants which were formed by the partial esterification of pentaerythritol.

In U.S. Pat. No. 4,336,176 issued Jun. 22, 1982, to Lindner, there is disclosed manufacture of polyvinylchloride compounds utilizing an organo-tin compound and a partial ester having functionality as both an internal lubricant and a co-stabilizer for the plastic.

U.S. Pat. No. 4,690,977 to Hosoi et al, issued Sep. 1, 1987, describes vinylchloride polymers comprising a grafted copolymer, the vinylchloride polymer, a rubber copolymer, and a lubrication system which includes a wax lubricant and epoxidized soybean oil. Hosoi et al makes similar disclosures in U.S. Pat. No. 4,645,795, issued Feb. 24, 1987.

U.S. Pat. No. 4,797,440 to Schofield et al, issued Jan. 10, 1989, describes a thermoplastic polymeric organic medium in the presence of a lubricant and a processing additive containing a divalent aliphatic radical. Among the thermoplastic polymers disclosed by Schofield et al, are polyvinylchloride. The possible materials utilized as lubricants by Schofield et al include 12-hydroxy stearic acid, stearic acid, stearamide, a polyethylene wax, as well as zinc and calcium stearates.

The stabilization of polyvinylchloride is taught in U.S. Pat. No. 4,338,226, issued Jul. 6, 1982, to Worschech et al. Various calcium and zinc fatty acids and polyol partial esters are disclosed. It is also disclosed by Worschech et al that high molecular weight complex esters may be utilized as lubricants and as well natural fats.

The stabilization of vinylchloride polymers is taught by Crochemore et al in U.S. Pat. No. 4,102,839, issued Jul. 25, 1978. The use of epoxidized soybean oil, a wax, calcium stearate and zinc stearate is disclosed by Crochemore for the processing of vinylchloride.

U.S. Pat. No. 3,951,883, issued Apr. 20, 1976, to Ruchlak, et al, discloses polyvinylchloride molding compositions. Tenaka et al, in U.S. Pat. No. 4,072,657, issued Feb. 7, 1978, discloses synthetic resins which include among others, vinylchloride-vinylacetate copolymers, and described as plasticizers therefore, fatty oils, and waxes.

U.S. Pat. No. 4,392,581, issued Jul. 12, 1983 to Itsubo et al describes vinylchloride resin compositions obtained from a mixed fatty acid ester of glycerin. U.S. Pat. No. 3,578,621 issued May 11, 1971 to Stapfer describes stearamide waxes which may be utilized for plastic processing.

Wilson, in U.S. Pat. No. 3,981,838 issued Sep. 21, 1976 describes various tri-carboxylic compounds which may be esterified and utilized in processing plastics. Wilson states that acid numbers under 2.5 are arbitrarily viewed as essentially triesters. Wilson further continues to state that acid numbers greater than that would correspond to a decrease in external lubricity.

Worschech in U.S. Pat. No. 3,875,069 describes lubricants for thermoplastic materials which are (A) mixed esters of aliphatic polyols, dicarboxlyic acids and long chained aliphatic monocarboxylic acids, and (B) esters of the group of dicarboxylic acids and long chained aliphatic monofunctional alcohols; esters of long chained aliphatic monofunctional alcohols and long chained aliphatic monocarboxylic acids; and complete or partial esters of aliphatic polyols and long chained aliphatic monocarboxylic acids in a ratio of (A) to (B) of 1:3 to 9:1.

Pigments have been dispersed in hydrocarbon waxes. The hydrocarbon waxes are long chain, essentially linear hydrocarbons. Such hydrocarbon waxes are not suitable for use with polar polymers as they interfere with the fusion of the polymer in an extruder. The hydrocarbon waxes are also not suitable for use with polar polymers because the hydrocarbon waxes cause streaking in the finished polar polymer article.

Throughout the specification and claims, percentages and ratios are by weight, temperatures are in degrees Celsius, and pressures are in Kpa gauge unless otherwise indicated. To the extent that any of the references cited herein are applicable, they are hereby specifically incorporated by reference. Ranges and ratios given herein may be combined.

SUMMARY OF THE INVENTION

The present invention describes a method of preparing a pigment for use in a polymer composition including the steps of:

a. obtaining an aqueous slurry of a pigment in water;

b. adding to said slurry a polyester component having at least one free hydroxyl group to obtain a first mixture;

c. removing at least a portion of said water from said first mixture to obtain a second mixture;

d. obtaining said second mixture at temperature where said second mixture is a solid; and e. grinding said second mixture to obtain a pulverant product comprising said polyester component and said pigment.

A further aspect of the invention is a method of preparing a pigment for use in a polymer composition including the steps of:

a. obtaining an aqueous slurry of a phthalocyanine pigment in water;

b. adding to said slurry a glyceride containing free hydroxyl groups in the fatty backbone to obtain a first mixture;

c. removing at least a portion of said water from said first mixture to obtain a second mixture;

d. obtaining said second mixture at temperature where said second mixture is a substantially water free solid; and, e. grinding said second mixture to obtain a pulverant product consisting essentially of said glyceride and said phthalocyanine pigment.

Yet a further aspect of the invention is a pulverant pigment composition consisting essentially of:

a. a phthalocyanine pigment; and b. a polyester component having a melt point of about 75° C. to about 120° C.

DETAILED DESCRIPTION OF THE INVENTION

Polyvinylchloride resins are polar polymers which are made through the polymerization of vinylchloride monomers. The polyvinylchloride resins are solid materials, usually in particulate form. Polyvinylchloride resins have the distinct advantage of being able to be extruded into various shaped articles having high gloss which are of a rigid nature.

One of the methods of obtaining useful polyvinylchloride articles involves as a first step extruding the polyvinylchloride resin. Typically, a twin screw extruder has the polyvinylchloride pellets fed into the extruder where the pellets are masticated, and thereafter a semi-solid (plastic) polyvinylchloride is extruded and fed to a molding or shaping device.

During the extrusion of polyvinylchloride, both heat and mechanical energy are applied to the extruder. The mechanical energy input to move the polyvinylchloride through the extruder is eventually present as heat energy in the resin. The invention works best when the polyvinylchloride pellets have a maximum dimension of 5 mm to 25 mm, preferably 6 mm to 12 mm.

It is desirable when processing polyvinylchloride that external heat energy be kept to a minimum for cost as well as product stability considerations. That is, it is possible to damage the polyvinylchloride resin by heating the resin to too great a degree during processing. The amount of heat energy applied in the extruding system will be dependent in part upon the characteristics of the lubricants utilized to assist in moving the resin through the extruder. That is, the polyvinylchloride pellets as they are masticated move over one another and friction results.

It is essential in the processing of polyvinylchloride that water not be present with the polyvinylchloride. The presence of water in an extruder operated at temperatures above the boiling point of water leads to blistering of the finished polyvinylchloride article. As some organic pigments are processed with water, there is the possibility of water being present in the extruder with the polyvinylchloride leading to the problems referenced above.

There is also a need in processing resins such as polyvinylchloride for an internal lubricant to aid in masticating the resin. The internal lubricant reduces the need for high operating temperatures and increases throughput of the extruder.

The present invention provides superior characteristics with regard to both internal lubricity properties and in the distribution of an organic pigment throughout the finished resin product without the introduction of substantial amounts of water to the extruder. The present invention may be utilized with any conventional polyvinylchloride extrusion equipment. Suggested sources of such extrusion equipment are found in the references cited herein.

The present invention utilizes a polyester component to introduce an organic pigment to the polar polymer. The polyester component is also capable of providing internal lubricity to the polar polymer during the extrusion process.

The polyester component described herein is preferably a triglyceride ester having at least one free hydroxyl group in the fatty backbone. The polyester components typically have molecular weights of from 400 to 1200, preferably 450 to 800.

It is desired that the polyester component not be functionalized with any other group. Thus a preference exists for materials where all the hydroxyl groups are free (not derivatized such as with an ester). It is also desirable that the polyester component not contain substantial amounts of unsaturation. If the polyester component contains unsaturation, it may well be too liquid to utilize, and may undergo degradation due to the heat in the extrusion process. It is thus preferred that the polyester component has a melt point of about 75° C. to about 120° C.

One such preferred polyester component is the triglyceride ester known as hydrogenated castor oil or castor wax. Castor wax contains three 12-hydroxy groups on the backbone of the stearic acid portion of the molecule, e. g. one free hydroxy group per triglyceride molecule. That is, it is desirable to avoid esters of castor oil which contain esterified hydroxyl groups on the fatty acid portion of the ester.

Suitable examples of other polyester triglycerides which may be utilized in the present invention are those which contain acid groups (carboxylic) acid wherein each acid group contains from about 15 to 22 carbon atoms. Preferably, the triglyceride contains from about 16 to about 20 carbon atoms.

As previously suggested, it is desired that any unsaturation within the triglyceride ester be saturated before its use in the present invention. Conventional hydrogenation techniques may be utilized to harden the triglyceride ester.

Additional polyester components utilized in the present invention may also be any polyester having one or more free alcoholic hydroxyl groups. In particular, the polyols to obtain the polyester component utilized in the present invention will have from 2 to 6 hydroxyl groups and will conveniently contain from 2 to 10 carbon atoms in the starting alcohol. The alcohols recommended herein include ethylene glycol, 1,2-propylene glycol, 1,3-propylene glycol, 1,4-butanediol, 2,3-butanediol, 1,5-pentanediol and 1,6 hexanediol.

Various triols having from 3 to 10 carbon atoms may also be utilized herein such as glycerine or trimethylol propane. The tetrols utilized herein may be erythritol or pentaerythritol. The tetrols are preferred for manufacturing the non glyceride polyester components of the present invention and in particular pentaerythritol is the preferred starting polyol.

The present invention also allows for the use of pentols having from 5 to 10 carbon atoms such as xylitol as well as hexols having from 6 to 10 carbon atoms such as mannitol, sorbitol or dipentaerythrite. Of the foregoing, several compounds are classified as sugars which are also generally useful herein provided they are polyol sugars without adverse functionality to the intended reaction products utility.

The present invention utilizes the polyester component to effectively deliver an organic pigment to a resin composition. Various organic pigments are useful in the present invention.

Phthalocyanine compounds are well known for use as pigments and are useful herein. Phthalocyanine compounds are available in a variety of pigment powders. The pigment may be diluted with inert materials, eg, clay, barium sulfate, calcium carbonate, or aluminum hydrate. Resins and aluminum benzoic acid salts can be incorporated to provide other diluted forms, i.e., lakes.

A number of metal phthalocyanine compounds are useful in the present invention. Fine-particle, well-dispersed phthalocyanine pigments are highly desired. Among the useful phthalocyanine compounds are the cobalt phthalocyanines, the vanadium phthalocyanines, the magnesium phthalocyanines, the iron phthalocyanines, the chloroaluminum phthalocyanines, and the vanadyl phthalocyanines.

Of particular interest herein are the copper phthalocyanines such as copper phthalocyanine blue. The most important commercial products are the pigmentary forms of copper phthalocyanine; they provide excellent resistance to heat and light, acid and alkalies, and are extremely insoluble in most solvents. The two principal classes of copper phthalocyanine pigments are the blues and greens. Pigment Blue 15 is particularly useful in polyvinylchloride.

B-Copper phthalocyanine blue is characterized by the greenish hue and purity of tine, i.e., cleanliness, which is necessary to produce the cyan component. It is, however, weaker in color strength than alpha-copper phthalocyanine blue. If it is combined with yellow and red or magenta inks, all the spectral colors can be reproduced.

Metal-free copper phthalocyanine blue, i.e., Pigment Blue 16, is a useful form of phthalocyanine and provides a greenish hue. Epsilon-phthalocyanine blue is a reddish pigment. The phthalocyanine greens are useful herein. The halogenated derivatives of phthalocyanine pigments retain the desirable characteristics of the blues. The older and more widely used variety, i.e., the chlorinated form, e. g., Pigment Green 7, represent the blue hues. The mixed chlorine and bromine derivatives and the brominated pigment ratio of bromine to chlorine causes a color shift in the pigment from bluish green to yellow green and may be used herein.

Additional phthalocyanine pigments suggested for use herein include: Direct Blue 86, Direct Blue 87, and Acid Blue 249. The sodium salt of cobalt phthalocyanine, i.e., Vat Blue 29. is also suggested for use herein.

ADDITIONAL COMPONENTS

Typically, many additional components are utilized in polyvinylchloride processing. Generally, any of the normally used components in polyvinylchloride processing which do not materially interfere with the functioning of the polyester component in the present invention may be utilized herein.

Such suitable additional components include materials such as calcium carbonate as a filler, a pigment such as titanium dioxide, an impact modifier such as Acryloid KM334 available from Rohm and Haas. Polyvinylchloride resins also contain stabilizers to prevent degradation of the resin in use. That is, hydrochloric acid is generated on degradation of the polyvinylchloride resin which then further initiates degradation of the resin and surrounding components. Many different stabilizers are utilized including various cadmium, lead, or tin compounds.

In the present invention, it is preferred to use tin stabilizers and a suggested source thereof is Advastab TM181. Further processing aids which may be utilized in the present invention include costabilizers and lubricants such as straight chain fatty acid salts including materials such as calcium or magnesium stearate.

Any of the foregoing components are typically utilized within the present invention at the levels normally found in polyvinylchloride processing systems.

AMOUNT OF THE COMPONENTS

Typically, when practicing the present invention the polyvinylchloride resin will be utilized at 100 parts with the polyester component utilized at from about 0.1 to about 2 parts per hundred parts of the polyvinylchloride. A more preferable range for the weight ratio of the polyester component to the polyvinylchloride is from about 0.2 part to about 1.75 parts; more preferably about 0.3 part to about 1.5 parts per 100 parts of the polyvinylchloride resin.

The phthalocyanine utilized in the present invention per hundred parts of the polyvinylchloride is typically at about 0.1 part to 0.5 parts; preferably at about 0.15 part to about 0.4 parts. The weight ratio of the pigment to said polyester component is conveniently about 5:1 to about 1:20.

What follows is an example of the present invention.

COMPARATIVE EXAMPLE I 2 parts of phthalocyanine blue are mixed together with 50 parts of water. The resultant mixture is ground in a ball mill to a particle size distribution through 20 mesh.

The resultant mixture of the phthalocyanine blue and the water is treated conventionally to centrifuge out most of the water. The substantially dry phthalocyanine compound is then spray dried. The spray dried product is found to agglomerate to a larger particle size. The spray dried product is then added to 400 parts of polyvinylchloride.

The spray dried phthalocyanine, the polyvinylchloride together with hydrogenated castor oil at 10 parts are mixed and processed through an extruder. The extruder achieves a temperature of 140 to 220° C. during the extrusion process.

An extruded article from the above process is graded for distribution of the phthalocyanine pigment within the molded article and found to be unacceptable. The product is acceptable with regard to internal lubricity and fusion in the extruder.

COMPARATIVE EXAMPLE II 2 parts of phthalocyanine blue are mixed together with 50 parts of water. The resultant mixture is ground in a ball mill to a particle size distribution through 20 mesh.

The resultant mixture of the phthalocyanine blue and the water is treated conventionally to centrifuge out most of the water. The substantially dry phthalocyanine compound is then spray dried. The spray dried product is found to agglomerate to a larger particle size. The spray dried product is then added to 400 parts of polyvinylchloride.

The spray dried phthalocyanine, the polyvinylchloride together with a hydrocarbon wax at 10 parts are mixed and processed through an extruder. The extruder achieves a temperature of 140 to 220° C. during the extrusion process.

An extruded article from the above process is graded for distribution of the phthalocyanine pigment within the molded article and found to be unacceptable. The product is also unaccceptable with regard to fusion in the extruder.

EXAMPLE I 2 parts of phthalocyanine blue are mixed together with 40 parts of water. The resultant mixture is ground in a ball mill to a particle size distribution through 20 mesh.

The resultant mixture of the phthalocyanine blue and the water is treated to centrifuge out most of the water. The substantially dry phthalocyanine compound is then mixed with 10 parts of the triester of 12-hydroxy stearic acid and glycerine, e.g. a triglyceride. The resultant product of the water, the phthalocyanine compound, and the triglyceride is thoroughly mixed together for 15 minutes and allowed to stand for one half hour.

The phthalocyanine compound is dispersible in the triglyceride to a greater extent than the phthalocyanine compound. The bulk of the phthalocyanine compound is dispersed in the triglyceride. The triglyceride is not soluble in the water. The water and any remaining phthalocyanine compound may be recycled with the next batch of the phthalocyanine compound to be ground.

The mixture of the triglyceride and the phthalocyanine compound retains the phthalocyanine particles in substantially the same size distribution as originally found after the grinding process, e. g. no agglomeration of the phthalocyanine particles has occurred in contrast to the spray drying operation.

The mixture of the triglyceride and the phthalocyanine compound at 12 parts is then added to 400 parts of polyvinylchloride.

The phthalocyanine compound, the triglyceride, and the polyvinylchloride are mixed and processed through an extruder. The extruder achieves a temperature of 140 to 220° C. during the extrusion process.

An extruded article from the above process is graded for distribution of the phthalocyanine pigment within the molded article and found to be acceptable article. The present invention allows lower usage of the pigment to obtain substantially identical color to the finished article. Conversely, the present invention allows stronger color development by utilizing increased amounts of pigment over that which is possible in the comparative example. The finished polymer articles do not exhibit substantial streaking and the product fuses easily in the extruder.

Having fully described my invention by having made a full and complete disclosure of that which is necessary to enable one skilled in the art to practice the present invention it is desired that the foregoing be utilized to exemplify but not to limit the scope of the present invention or its equivalents.

What is claimed is:

1. A method of preparing a pigment for use in a polymer composition including the steps of:
   a. obtaining an aqueous slurry of a pigment in water;
   b. adding to said slurry a polyester component having at least one free hydroxyl group to obtain a first mixture;
   c. removing at least a portion of said water from said first mixture to obtain a second mixture;
   d. obtaining said second mixture at a temperature where said second mixture is a solid; and
   e. grinding said second mixture to obtain a pulverant product comprising said polyester component and said pigment.

2. The method of claim 1 wherein said polyester component is a glyceride.

3. The method of claim 2 wherein said glyceride is contains free hydroxyl groups in the fatty backbone.

4. The method of claim 3 wherein said glyceride is a triglyceride.

5. The method of claim 4 wherein said triglyceride is the 12-hydroxy stearic acid triglyceride.

6. The method of claim 1 wherein said polyester component has a melt point of about 75° C. to about 120° C.

7. The method of claim 1 wherein said pigment is an organic pigment.

8. The method of claim 7 wherein said pigment is a metal containing compound.

9. The method of claim 8 wherein said organic pigment is a phthalocyanine compound.

10. The method of claim 9 wherein the weight ratio of said pigment to said polyester component in said second mixture is about 5:1 to about 1:20.

11. A method of preparing a pigment for use in a polymer composition including the steps of:
    a. obtaining an aqueous slurry of a phthalocyanine pigment in water;
    b. adding to said slurry a glyceride containing free hydroxyl groups in the fatty backbone to obtain a first mixture;
    c. removing at least a portion of said water from said first mixture to obtain a second mixture;
    d. obtaining said second mixture at a temperature where said second mixture is a substantially water free solid; and,
    e. grinding said second mixture to obtain a pulverant product consisting essentially of said glyceride and said phthalocyanine pigment.

12. The method of claim 11 comprising the step of mixing said second mixture with polyvinylchloride.

13. The method of claim 11 wherein the weight ratio of said pigment to said glyceride in said second mixture is about 5:1 to about 1:20.

14. The method of claim 11 wherein said glyceride is hydrogenated castor oil.

15. The method of claim 14 wherein said phthalo-cyanine pigment is a metallic compound.

* * * * *